United States Patent [19]
Miller

[11] Patent Number: 5,954,513
[45] Date of Patent: Sep. 21, 1999

[54] SURGICAL TRAINING APPARATUS AND METHODS

[75] Inventor: Eric C. Miller, Fairfield, Conn.

[73] Assignee: United States Surgical Corporation, Norwalk, Conn.

[21] Appl. No.: 08/838,705

[22] Filed: Apr. 9, 1997

[51] Int. Cl.[6] .............................. G09B 23/28; G09B 9/00
[52] U.S. Cl. ............................................ 434/262; 434/218
[58] Field of Search .................................. 434/218, 262, 434/267, 268, 269, 272

[56] References Cited

U.S. PATENT DOCUMENTS

| | | | |
|---|---|---|---|
| 3,010,223 | 11/1961 | Alderson | 434/267 |
| 4,014,109 | 3/1977 | Schramm | 434/218 |
| 4,280,047 | 7/1981 | Enos | 250/252.1 |
| 4,782,640 | 11/1988 | Schweiwiller | 52/586 |
| 4,889,991 | 12/1989 | Ramsey et al. | 250/336.1 |
| 4,959,547 | 9/1990 | Carroll et al. | 250/336.1 |
| 5,376,803 | 12/1994 | Mc Fee et al. | 250/496.1 |

OTHER PUBLICATIONS

CIS–US, Inc., "Nuclear Medicine Q.C. and Calibration Source Catalog", Rev. 1096.
Isotope Products Laboratories, "Anodized, Electroplated, Deposited and Polysurface™ Disc and Planar Standards", 0795.

Primary Examiner—Robert A. Hafer
Assistant Examiner—John Edmund Roynak

[57] ABSTRACT

Surgical training apparatus and methods are provided simulating a patient having a background radiation emissions level and at least one concentrated source of radiation emissions. The apparatus includes a first zone having a predetermined traceable background radiation emission level. Preferably, this level is generated by incorporating radioactive nuclides into or on the material of construction of the first zone. These radioactive nuclides are well known to those skilled in the art and include Cl-36, Co-57, Co-60, Sr-90, Tc-99, Cs-137, Tl-204, Th-230, Pu-238, Pu-239, Am-241, Cr-51, Sr-85, Y-88, Cd-109, Ba-133, Bi-210, Ge-68, Ru-106, as well as other Alpha and/or Beta emitters.

A more concentrated radiation source is incorporated into the apparatus in conjunction with the first zone. This radiation source can be configured, for example, to simulate a concentration of radionucleid labeled antibodies at a tumor site, or, in the case of lymphatic mapping, lesion drainage and accumulation sites.

It is also contemplated that simulated injection sites and/or drainage channels be formed adjacent the first zone. A plurality of apparatus may be incorporated to simulate depth of field. Also, overlays simulating, e.g. biological topography, can be used to further enhance the training environs.

5 Claims, 4 Drawing Sheets

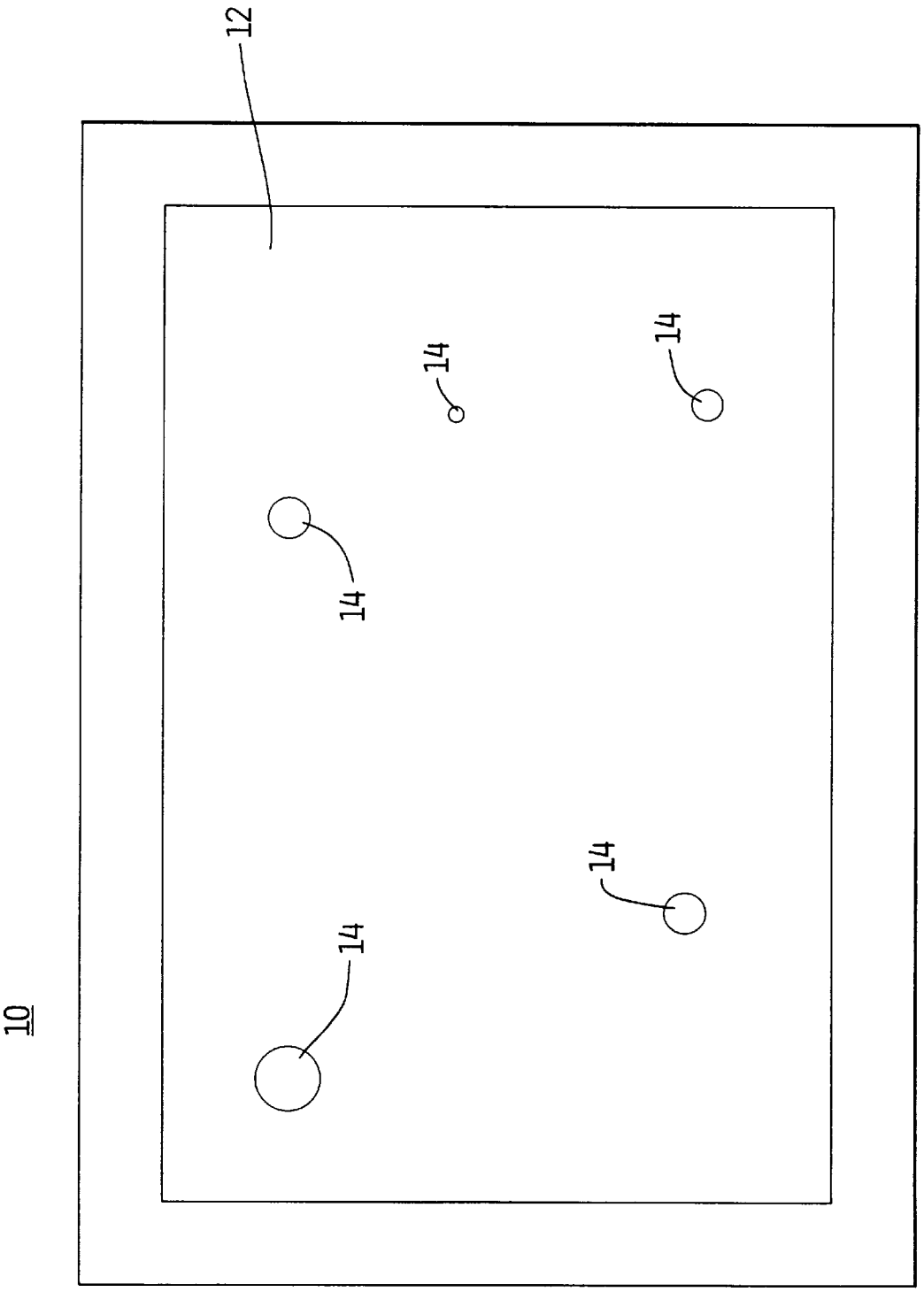

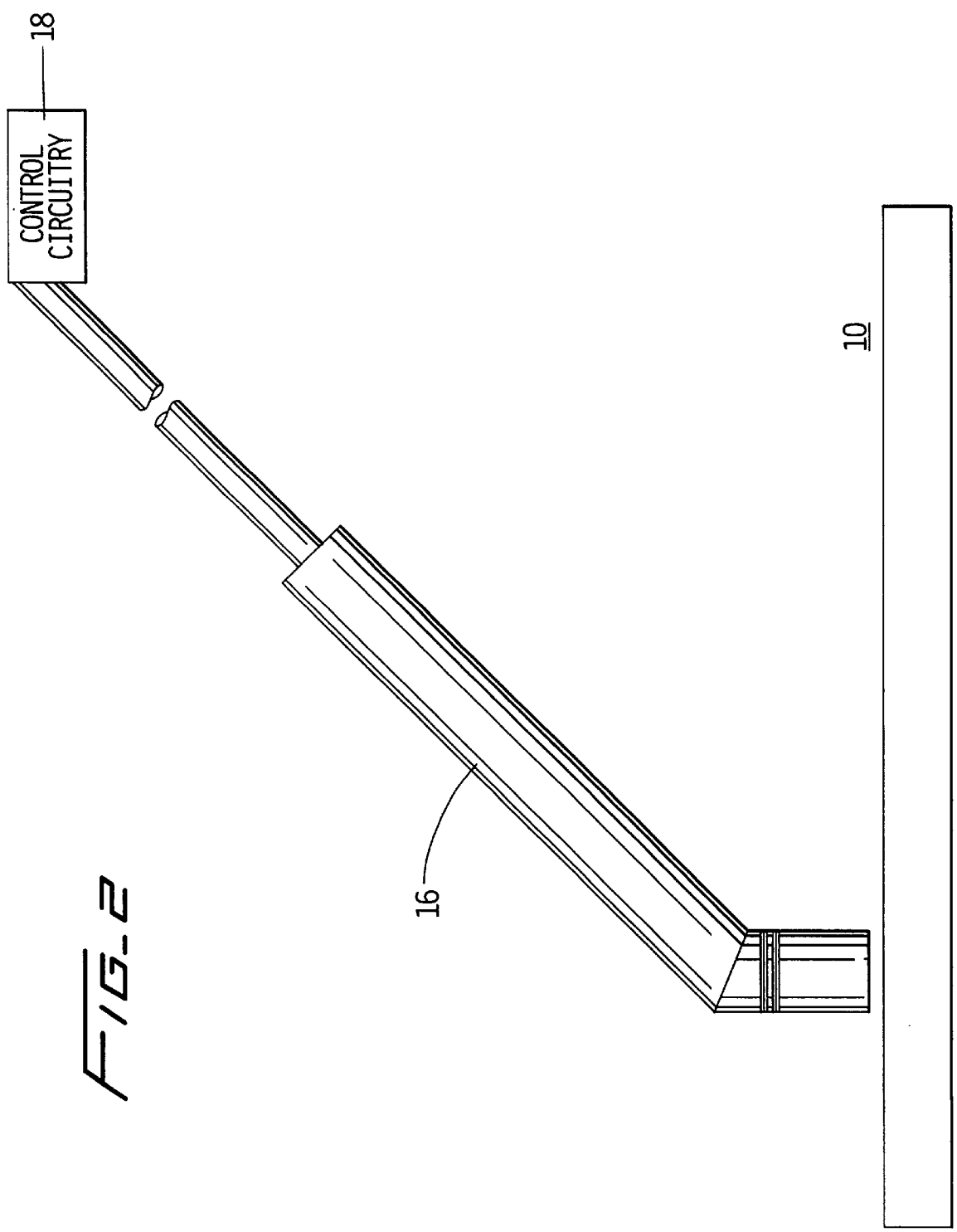

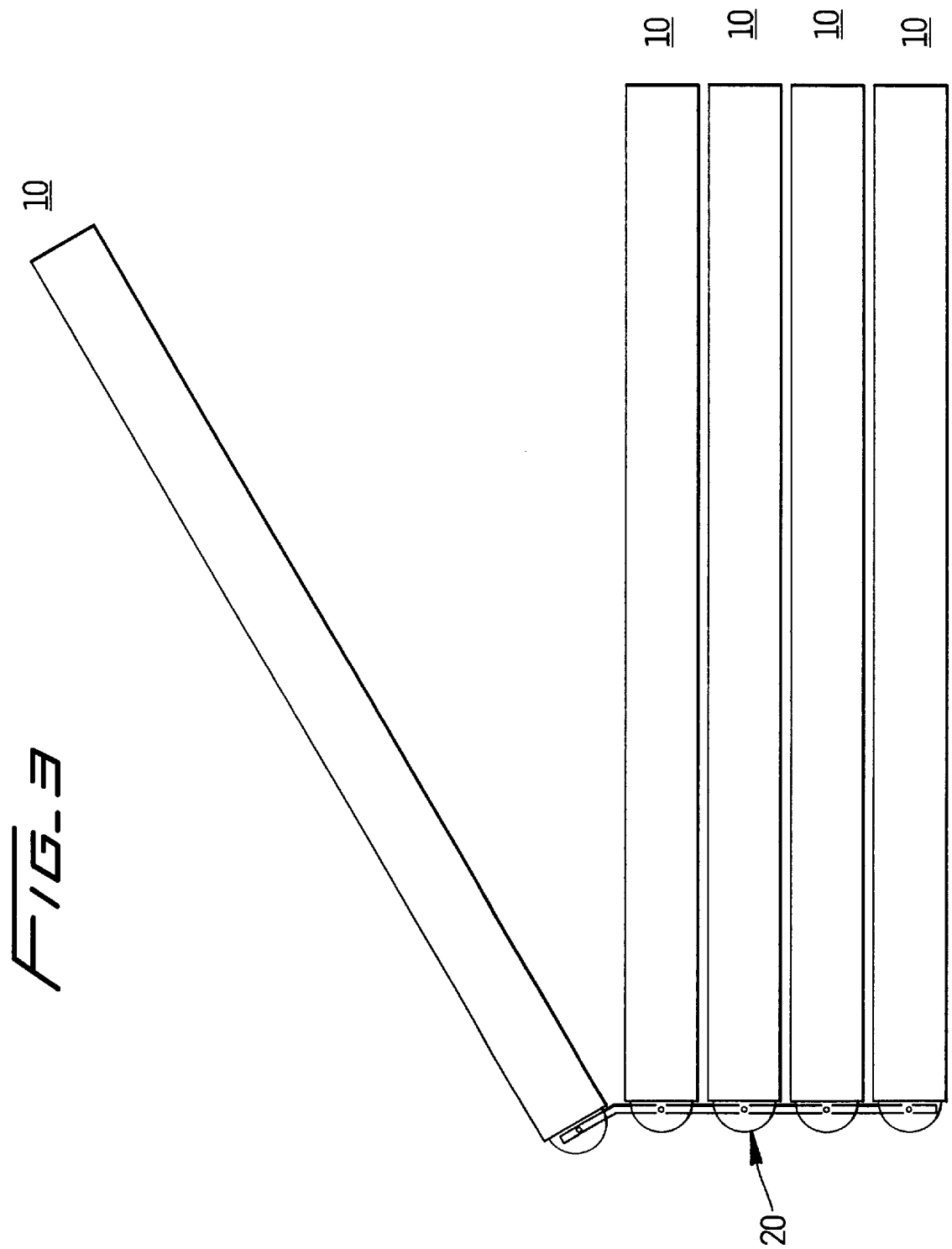

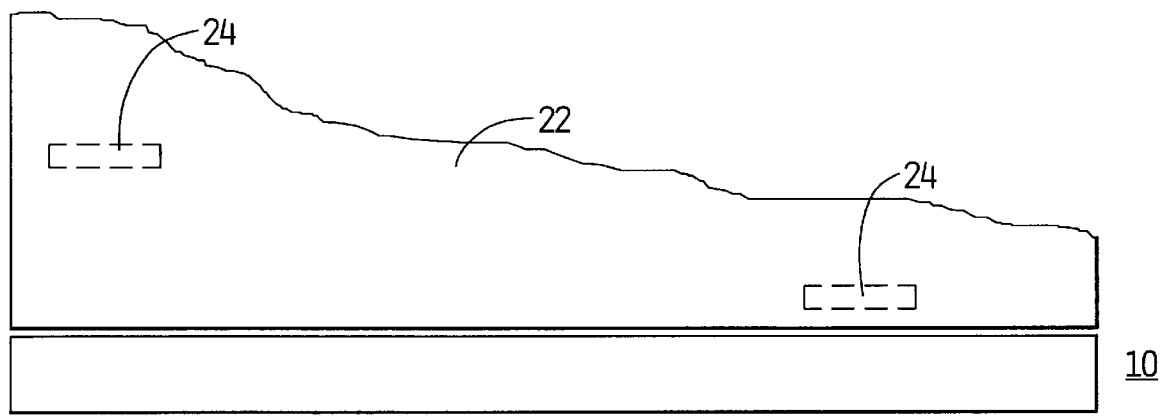
FIG_4
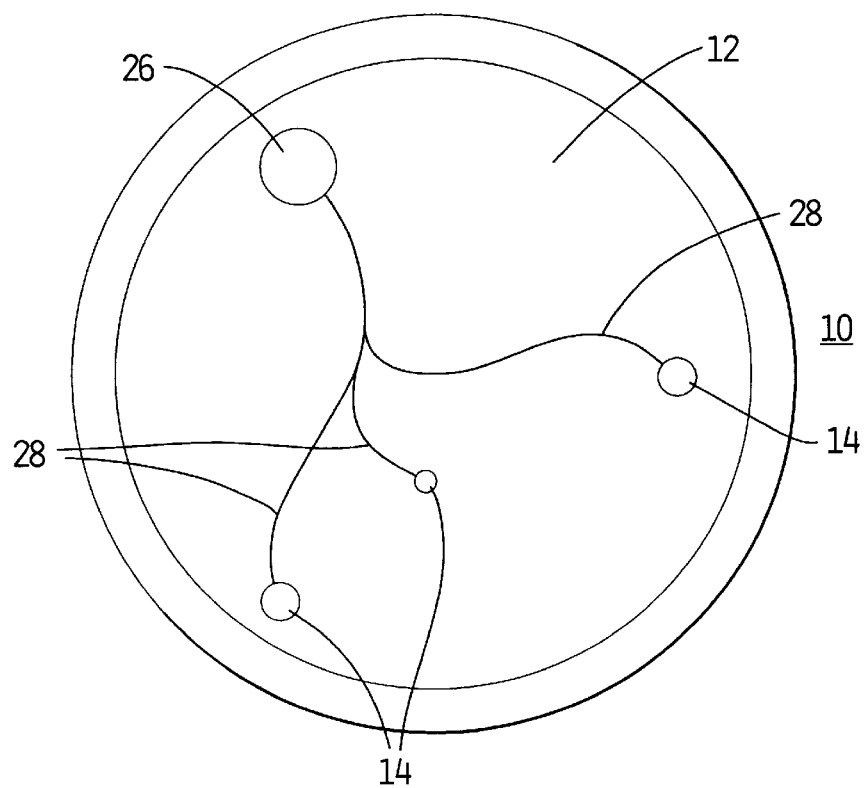
FIG_5

SURGICAL TRAINING APPARATUS AND METHODS

BACKGROUND

1. Technical Field

This disclosure relates generally to surgical training and demonstration apparatus. More particularly, to apparatus and methods for demonstrating and training surgeons in the detection, localization and imaging of radiation in biological systems.

2. Background of the Related Art

The detection of cancerous tissue using emissions from radionucleid labeled antibodies has been the subject of intense investigation for many years. Typically, the procedures involve the injection of radionucleid labeled antibodies into a patient. Over time, e.g. four to twenty-four hours, these labeled antibodies concentrate at tumor sites where they can be detected using sophisticated radiation detection equipment.

The particular choice of radionucleid for labeling antibodies is dependent on its nuclear properties, the physical half life, the detection instrument capabilities, the pharmacokinetics of the radiolabeled antibody and the degree of difficulty of the labeling procedure. Early techniques utilized the $^{131}$I radionucleid in conjunction with a relatively large and complex gamma camera positioned above the patient during the imaging process. This technique was less than ideal because the high energy gamma-photon emitted from $^{131}$I is not well detected by traditional gamma cameras. In addition, the administered marker emissions deliver a high radiation dose to the patient. These techniques are also deficient in that, as tumor sites become smaller, the radionucleid concentrations tend to become lost, from an imaging standpoint, in the background or blood pool radiation necessarily present in the patient.

In an effort to overcome these limitations, extensive research has been carried out in the field using much lower energy gamma emissions levels, for example, $^{125}$I (27–35 kev), in conjunction with probe-type detection structure configured for insertion into the patient's body to minimize attenuation.

This improved method of localization, differentiation and removal of cancerous tumors involves a surgical procedure wherein the patient suspected of having neoplastic tissue is administered an effective amount of a labeled antibody specific for neoplastic tissue. The antibody is labeled with a radioactive isotope exhibiting photo emissions of specific energy levels.

The surgical procedure is then delayed for a time interval to permit the labeled antibody to concentrate in the neoplastic tissue and to be cleared from normal tissue so as to increase the ratio of photon emissions from the neoplastic tissue to the background photon emissions. Once this time interval passes, the patient is surgically accessed and tissue within the operative field to be examined for neoplastic tissue is measured for a background photon emission count. Thereafter, a hand held probe is manually manipulated within the operative field adjacent tissue suspected of being neoplastic.

This procedure, commonly referred to as "radioimmuno guided surgery" or RIGS was pioneered by E. W. Martin, Jr., M. D. and M. O. Thurston, Ph.D. A more detailed presentation of RIGS is found in U.S. Pat. No. 4,782,640 to Martin and Thurston, the disclosure of which is incorporated herein by reference.

Another common procedure which makes use of radionucleid labeled antibodies is known as Lymphatic Mapping and is used in the diagnosis and treatment of e.g. skin or breast cancers. This procedure permits the surgeon to map the drainage of cancerous lesions to determine the extent and location of their expansion in the body. Radionucleid labeled antibodies are injected at the site of the known lesion and permitted to circulate with the drainage of the lesion to the lymph nodes. Thereafter, using a radiation detector, the specific lymph nodes affected by the lesion can be identified and selectively treated.

In carrying out the RIGS and lymphatic mapping procedures, the encountered radiation may be quite random and the background-to-concentration ratios may vary widely. To be used to its maximum effectiveness these procedures should be carried out by a highly trained surgeon experienced in the nuances of cancerous tissue detection. To date, surgeons have been trained using textbooks, observation and animal studies. While these are adequate to familiarize the surgeons with ideal or typical background-to-concentration readings, they are inadequate to simulate actual physiological patient conditions and, in the case of animal laboratory studies are quite expensive. Further, in animal studies neoplastic tissue is typically not inherently present, making simulation of background radiation and areas of concentration difficult at best.

Accordingly, a need exists for a surgical training/demonstration structure which can be used in training surgeons in in vivo radiation detection without the need for animal laboratory studies.

SUMMARY

The present disclosure is addressed to a surgical training apparatus for simulating a patient having a background radiation emissions level and at least one concentrated source of radiation emissions. The apparatus includes a first zone having a predetermined traceable background radiation emission level. Preferably, this level is generated by incorporating radioactive nuclides into or on the material of construction of the first zone. These radioactive nuclides are well known to those skilled in the art and include Cl-36, Co-57, Co-60, Sr-90, Tc-99, Cs-137, Tl-204, Th-230, Pu-238, Pu-239, Am-241, Cr-51, Sr-85, Y-88, Cd-109, Ba-133, Bi-210, Ge-68, Ru-106, as well as other Alpha and/or Beta emitters.

A more concentrated radiation source is incorporated into the apparatus in conjunction with the first zone. This radiation source can be configured, for example, to simulate a concentration of radionucleid labeled antibodies at a tumor site, or, in the case of lymphatic mapping, lesion drainage and accumulation sites.

It is also contemplated that simulated injection sites and/or drainage channels be formed adjacent the first zone. A plurality of apparatus may be incorporated to simulate depth of field. Also, overlays simulating, e.g. biological topography, can be used to further enhance the training environs.

BRIEF DESCRIPTION OF THE DRAWINGS

Various embodiments of the subject surgical training apparatus are described herein with reference to the drawings wherein:

FIG. 1 is a top plan view of the surgical training apparatus configured to simulate a radioimmuno guided surgery procedure;

FIG. 2 is a side view of the surgical training apparatus illustrating a detection probe in position over the surgical training apparatus for detection of concentrations of radiation;

FIG. 3 is a side view of the surgical training apparatus illustrating a stacked configuration;

FIG. 4 is a side view of the surgical training apparatus incorporating a topographical overlay; and FIG. 5 is a top plan view of the surgical training apparatus configured to simulate a lymphatic mapping procedure.

DETAILED DESCRIPTION OF PREFERRED EMBODIMENTS

Referring now in detail to the drawings in which like reference numerals identify similar or identical elements, a preferred embodiment of the surgical training apparatus in accordance with the subject disclosure is illustrated in FIG. 1 and is designated generally by reference numeral 10. Although this apparatus is specifically configured to simulate a RIGS procedure, the present disclosure contemplates any surgical procedure involving radiation detection in the localization and treatment of diseased tissue.

A first zone 12 is formed with a material having a predetermined traceable background radiation emission level. Preferably, first zone 12 is a disc or planar standard having an aluminum stainless steel or plastic backing with either an electroplated or deposited array of Alpha or Beta sources thereon. These Alpha and Beta sources are well known in the art and include: Cl-36; Co-57; Co-60; Sr-90; Tc-99; Cs-137; Tl-204; Th-230; Pu-238; Pu-239; Am-241; Cr-51; Sr-85; Y-88; Cd-109; Ba-133; Bi-210; Ge-68; and Ru-106. Other suitable Alpha or Beta emitters are also contemplated and are known to those skilled in the art. Suitable structure for the first zone 12 include standards available from Isotope Products Laboratories of Burbank, Calif.

The first zone 12 simulates background radiation levels in a patient injected with radionucleid labeled antibodies. This background radiation level also serves as a basis for the calibration of the detector system (not shown). Areas of concentration of radionucleid labeled antibodies, e.g. at a tumor site, are simulated by applying higher level radiation sources 14 adjacent first zone 12. These higher level radiation sources 14 can be deposited with, painted onto or integrally formed with the first zone 12 and are preferably not visually discernable from the first zone 12.

In a preferred embodiment, a multiplicity of concentrated sources 14 of varying activity levels can be formed on the first zone 12 to assist the surgeon in distinguishing activity strength. Different levels of activity are illustrated in FIG. 1 by the varying diameters of circles 14.

FIG. 2 shows a probe-type detecting device 16 positioned over training apparatus 10. This device 16 is preferably configured for insertion into a patient's body and is capable of detecting extremely low levels of radiation. U.S. Pat. No. 4,801,803 to Denon et al. and U.S. Pat. No. 4,889,991 to Ramsey et al., both incorporated herein by reference, disclose a probe instrument and related control circuitry having the requisite sensitivity for use with relatively low energy radionucleids.

When using the device 16 in conjunction with training apparatus 10, the surgeon first calibrates the detector's control circuitry 18 to the background radiation and then moves the device over the apparatus 10 while discerning increases in radiation levels. These increases can then be localized until the source is pinpointed. By selecting appropriate nucleids, the detection process for tumor localization can be accurately and easily simulated.

Referring now to FIG. 3, multiple layers of training apparatus 10 may be incorporated into a training or demonstration kit. This multi-layered kit can be used to simulate tumors at varying depths and spatial orientations from the probe 16. As shown in FIG. 3, the apparatus 10 can be pivotally connected to one another by binding 20 or may simply be stacked one atop another.

FIG. 4 illustrates a training apparatus 10 having an overlying topographical structure 22. This arrangement can be used to simulate tissue through which the surgeon may dissect to localize a radiation source. This structure 22 may be formed of a closed cell foam or gel which closely parallels the attenuation levels of body tissue. It is further envisioned that the topographical structure 22 may be provided with background radiation levels and, in addition, areas of concentrated radiation 24 therein to simulate in vivo tumor localization, etc.

Referring now to FIG. 5, a disc shaped apparatus 10 is illustrated. This apparatus also includes a first zone 12 formed with a material having a predetermined traceable background radiation emission level. In this embodiment, areas of concentration 14 are configured to simulate lymph nodes. These areas are interconnected to an even higher level of concentration 26 which represents a known cancerous lesion site. The interconnecting channels 28 simulate lymph drainage routes. Using this apparatus, a surgeon can be trained in procedures such as Lymphatic Mapping. By starting at the lesion site, the surgeon can methodically track the radiation signature along channels 28 to reach the areas of concentration 14 simulating the lymph nodes. As outlined above, it is also contemplated that this embodiment may be used in a stacked configuration (See FIG. 3) or with a topographical overlay (FIG. 4).

It will be understood that various modifications may be made to the embodiments shown herein. For example, the first zone illustrated above need not be planar but can be fabricated in any desired shape or configuration. Also, the radionucleids can be selected from any group appropriate to training and/or demonstration. Therefore, the above description should not be construed as limiting, but merely as exemplifications as preferred embodiments. Those skilled in the art will envision other modifications within the scope and spirit of the claims appended hereto.

What is claimed is:

1. A surgical training apparatus comprising:
 a first zone including a substantially uniform traceable background radiation emission level; and
 at least one radiation source formed adjacent the first zone and radiographically discernable from the background radiation emission level of the first zone;
 wherein the first zone includes a layer of radionucleids having a predetermined output to simulate in vivo background radiation levels;
 wherein the layer of radionucleids is electroplated onto a backing material.

2. A surgical training apparatus as in claim 1, wherein the backing material is selected from the group consisting of aluminum, stainless steel and plastic.

3. A surgical training apparatus as in claim 1, wherein a plurality of radiation sources are formed adjacent the first zone; the plurality of radiation sources being interconnected by radiographically discernable lines.

4. A surgical training apparatus as in claim 3, wherein the radiation sources and lines are configured to simulate a lesion with lymphatic drains and accumulations.

5. A surgical training apparatus comprising:

a backing material;

a first zone of radionucleids layered onto the backing material and exhibiting a substantially uniform traceable background radiation emission level; and at least one radiation source layered onto the first zone, the at least one radiation source having a radiation level which is radiographically discernable from the background radiation emission level of the first zone;

wherein a plurality of radiation sources are formed adjacent the first zone;

the plurality of radiation sources being interconnected by radiographically discernable lines.

* * * * *